United States Patent Office 2,899,295
Patented Aug. 11, 1959

2,899,295

SEPARATION OF TIN FROM ALLOYS

Wilbur T. Kattner, Richland, Wash., assignor to the United States of America as represented by the United States Atomic Energy Commission No Drawing. Application December 17, 1952
Serial No. 326,603

2 Claims. (Cl. 75—64)

This invention deals with a process of separating copper from tin associated therewith in the form of an alloy, and in particular with the removal of copper from tin scrap materials.

When coating or "jacketing" uranium-containing fuel elements for neutronic reactors, a "triple-dip" process is usually employed which comprises immersion of the element first into a bath of molten bronze, second into a bath of molten tin that contains from 0.1 to 0.4% by weight of aluminum, and third into a bath containing 89% aluminum and 11% silicon. The bath of tin, after repeated use, becomes contaminated by copper derived from the first layer and also by minor quantities of uranium removed by the hot bath from the fuel element. The uranium content of such contaminated tin or "scrap tin" normally is below 1% and does not have any harmful effects. However, the copper content increases considerably with each use, and once it exceeds 5%, a crystal deposit takes place after applied as the second layer, which crystals impair the adherence of the following aluminum-silicon layer. These copper-enriched scrap tin baths have represented quite a problem in the past.

Various regeneration processes have been devised to reduce the copper content in these used tin baths to a concentration of less than 2%, because a copper content of up to 2% was found not to have any harmful effect in the triple-dip process. In one of the preferred processes used for this purpose a great part of the copper content is removed by heating the copper-contaminated scrap tin to from 325 to 600° C. whereby it is melted and then slowly cooling the melted alloy to from 280 to 240° C. whereby crystals of so-called eta-bronze, $Cu_3Sn_5$, precipitate. Cooling within from 16 to 32 hours to a temperature of about 250° C. has been found preferable. The crystals are separated from the thus treated tin by mechanical means, and the tin may then be re-used in the triple-dip process. This process forms the subject matter of the copending application, Serial No. 190,044, filed by Edward A. Smith and Wilbur T. Kattner on October 13, 1950.

The separated crystals of eta-bronze, which also contain a certain amount of entrained tin, cannot be recycled into new portions of scrap tin for crystallization because their high copper content would bring the scrap tin outside the territory of formation of eta-crystals. On the other hand, the crystals should not be discarded for economical reasons on account of their uranium and tin contents. These crystals together with the entrained tin on an average contain, in addition to tin, from 20 to 25% by weight of copper, about 0.02% of aluminum, and about 0.02% of uranium; they usually represent from 25 to 35% of the initial scrap tin. Thus, discarding these crystals would result in a material loss of valuable materials altogether.

It is an object of this invention to provide a process for the fractionation of the ingredients contained in eta-bronze material.

It is also an object of this invention to regenerate a copper-contaminated tin bath and to secure maximum tin recovery by making recycling of one fraction thereof possible.

It has been found that, if the separated crystals of eta-bronze with the entrained tin obtained as described above are remelted and slowly cooled to a temperature between 520 and 420° C., another crystal precipitation takes place, however not of eta-crystals but of epsilon-crystals, $Cu_3Sn$. Thus, by this second crystallization step, four atoms of tin are "released" from the eta-compound $Cu_3Sn_5$, which together with the entrained tin is present in the form of a liquid phase. This liquid phase has a lower copper content than the melted eta-crystals, its exact copper content depending on the temperature to which it was cooled, lower cooling temperatures yielding higher crystallization and a lower copper content in the melted phase. However, in any case within the range of 520 to 420° C., the copper content in the liquid phase is low enough to allow recycling for eta-crystallization.

The process of this invention thus comprises melting the tin containing at least 5% copper, slowly cooling the melted alloy to from 280 to 240° C. whereby eta-phase bronze crystallizes, separating the eta-bronze crystals from the liquid metal by mechanical means, heating said separated crystals to a temperature of up to about 600° C. whereby they melt, slowly cooling the melted metal to a temperature from 520 to 420° C. whereby crystals of epsilon-bronze precipitate, removing said epsilon-bronze crystals from the remaining molten metal, and reintroducing the remaining molten metal into the process for eta-crystallization.

In both crystallization steps the cooling is preferably carried out over a long period of time because larger crystals are then obtained and crystal separation is facilitated. The crystals usually float on the surface of the melt. The separation may be carried out by any mechanical means known to those skilled in the art, for instance by filtration, centrifugation, sieving or skimming. Skimming with a perforated ladle, as is described in detail in the above-mentioned copending application, has been found particularly advantageous.

The tin left after removal of the epsilon-crystals is then bailed into pigs and cooled therein for storage; however, the tin may also be directly recycled for eta-crystallization while still liquid and mixed with the scrap tin derived from the triple-dip process.

During eta-crystallization of the original scrap tin a small part, the "dregs," settles at the bottom of the melting container; it is a crystalline mass and contains the bulk of the uranium present in the scrap tin, some copper and tin.

These dregs may be further processed to recover the uranium. This may be accomplished, for instance, by chlorinating the dregs and fractionally condensing the chlorides formed. Chlorination may be carried out with chlorine gas, hydrogen chloride, carbon tetrachloride, thionyl chloride, and a mixture of sulfur monochloride and chlorine. The uranium chloride condenses at a higher temperature than does the tin chloride. It will be understood that this chlorination process may also be used for the recovery of uranium contained in the epsilon-crystals.

In the following, two examples are given for the purpose of illustrating the process of this invention without the intention to limit the scope of the invention to the details given therein.

*Example I*

Two batches each of eta-bronze crystals, as they were obtained by crystallization of scrap tin from the triple-dip process at a temperature of about 250° C., were heated in a resistance furnace until molten. A small quantity of oxidized dross formed on the surface of the melt. This dross, or skimmings, was separated from the melt, and both were analyzed. Thereafter the melts were cooled down to 477° and 515° C., respectively, to permit precipitation of epsilon-crystals. The crystals and the remaining molten metal were also analyzed in each instance. The data are recorded in the following table.

| Run | Sample of— | Sampling Temp., °C. | Analysis, percent by weight | | | |
|---|---|---|---|---|---|---|
| | | | Cu | Sn | U | Al |
| 1 | Skimmings | 566 | 15.30 | 29.56 | 5.15 | 1.74 |
| | Melt | 510 | 19.64 | 78.56 | 0.05 | 0.17 |
| | Crystals | 477 | 36.9 | 60.2 | 0.39 | 0.05 |
| | Recovered melt | 477 | 12.1 | 84.7 | 0.42 | 0.03 |
| 2 | Skimmings | 593 | 17.9 | (1) | 0.26 | (1) |
| | Melt | 593 | 21.0 | 75.0 | (1) | (1) |
| | Crystals | 515 | 40.8 | 54.9 | (1) | (1) |
| | Recovered melt | 515 | 16.4 | 79.7 | (1) | (1) |

¹ Not ascertained.

These two experiments show that further copper-withdrawal is accomplished by the epsilon-crystallization and that more copper is removed if a lower crystallization temperature is used. The epsilon-bronze crystals when analyzed were wetted by the melted metal and therefore did not have the stoichiometrical copper and tin contents that correspond to the formula $Cu_3Sn$ of epsilon-bronze.

The melted phase remaining after removal of the epsilon-crystals may be further cooled to about 250° C. to allow precipitation of eta-bronze crystals. By this, from 35 to 50% of the original quantity of tin present may be recovered for re-use in the triple-dip canning process. The eta-crystals obtained in this "after-crystallization" step may be combined with the eta-crystals obtained in the first crystallization step and subjected to epsilon-crystallization.

*Example II*

A quantity of 538 pounds of scrap tin derived from the triple-dip process and containing about 5% of copper was heated to 600° C. and then slowly cooled to about 250° C. Eta-crystals precipitated. These crystals were separated from the melted phase; the latter weighed 389.6 pounds and contained less than 2% copper. This represents a recovery of about 75% of tin re-usable in the triple-dip process.

These separated eta-crystals, which weighed about 148 pounds, were remelted at about 600° C., and the melted metal was then slowly cooled to approximately 420° C. 99 pounds of epsilon-crystals precipitated which, when separated, left about 49 pounds of tin that contained approximately 9% of copper. The melt thus contained 45 pounds of tin which were returnable into the process; the melt is preferably mixed with scrap tin from the triple-dip process for eta-crystallization.

It will be understood that the process is not restricted to the regeneration of scrap tin derived from triple-dip processes, but that it may also be successfully applied to the recovery of copper and tin from any other type of bronze.

It will also be understood that this invention is not to be limited to the details given herein but that it may be modified within the scope of the appended claims.

What is claimed is:

1. A process of recovering tin from bronze comprising melting the bronze; slowly cooling the melted metal to from 280 to 240° C. whereby eta-phase bronze crystallizes; separating the eta-bronze crystals from the liquid metal by mechanical means; melting the separated crystals; slowly cooling the melted eta-crystals to a temperature from 520 to 420° C. whereby crystals of epsilon-bronze precipitate; removing said epsilon-crystals from the remaining molten metal; and reintroducing the remaining molten metal into the process for eta-crystallization.

2. A process of recovering tin from bronze comprising melting the bronze; slowly cooling the melted metal to from 280 to 240° C. whereby eta-phase bronze crystallizes; separating the eta-bronze crystals from the liquid metal by mechanical means; melting the separated crystals; slowly cooling the melted eta-crystals to a temperature from 520 to 420° C. whereby crystals of epsilon-bronze precipitate; removing said epsilon-crystals from the remaining molten metal; cooling the remaining molten metal to from 280 to 240° C. whereby eta-bronze crystals precipitate; removing said eta-bronze crystals from the molten tin; and adding said eta-crystals to those obtained in the first crystallization step for further processing by epsilon-crystallization.

No references cited.